United States Patent [19]
Smith

[11] 3,819,155
[45] June 25, 1974

[54] LINE PULLING APPARATUS

[76] Inventor: William E. Smith, 208 S. Kelsey, Monroe, Wash. 98272

[22] Filed: Aug. 28, 1972

[21] Appl. No.: 284,243

[52] U.S. Cl. ............................................. 254/175.5
[51] Int. Cl. ............................................. B66d 1/76
[58] Field of Search ........... 226/168, 181, 182, 183, 226/184, 190, 193; 254/175.5

[56] References Cited
UNITED STATES PATENTS
3,034,767   5/1962   Gordon .............................. 226/183
3,078,074   2/1963   Benedict .......................... 254/175.5
3,343,809   9/1967   Newell .............................. 254/175.5

*Primary Examiner*—Allen N. Knowles
*Attorney, Agent, or Firm*—Graybeal, Barnard, Uhlir & Hughes

[57] ABSTRACT

A pair of like shaped concave plates having flanged edge portions, the plates being joined together back-to-back on a circular line inwardly from their peripheries to form a nip. The joined plates are centrally mounted on a rotatable shaft and drive means are provided to rotate the shaft such that a line laid between the flanged edges of the plates is pulled down into the nip and wrapped around the juncture of the plates. A non-metallic line stripping means is mounted adjacent the rotating plates and includes an elongate finger means extending between the plates and into the nip formed therebetween to completely fill the space between the flanged plates to remove the line from the nip and prevent its being wrapped completely around the rotating plates.

2 Claims, 5 Drawing Figures

LINE PULLING APPARATUS

BACKGROUND OF THE INVENTION

1. Field of the Invention

This invention relates, in general, to a line pulling apparatus of the type used by commercial fishermen, and in particular, to a line pulling apparatus having an improved line stripping mechanism.

2. Description of the Prior Art

Many forms of commercial fishing, such as tuna fishing, still employ the age old technique of dangling a disguised hook on the end of a line to attract a fish and pulling the line into the boat after a fish has been hooked. Line pulling mechanisms to assist in rapidly retrieving a line are known, one form comprising a powered reel on which the line is wound. Where speed in placing the line back in the water is critical, another form of line puller comprising a rotating spool which grips the line and pulls it to wrap it thereabout and a finger which peels the line from the spool before it is completely wrapped therearound such that it falls into a collecting basket or the like from which it may be rapidly pitched overboard is also known. This invention relates in particular to structures of the latter type.

In tuna fishing in particular, the fisherman seeks to direct his boat into a school of tuna and then move with the school through the water so that the fish may be hooked on the lines dropped over the side. The length of time a boat may be maintained within a school generally determines the success of the fisherman and fishermen strive to avoid or eliminate conditions which would tend to shorten this time. The lines themselves are of necessity relatively short to allow for their rapid repeated retrieval and line pulling mechanisms greatly speed up the retrieval of the hooked fish. When the fisherman is able to maintain the boat directly within the school of fish for a substantial period great numbers of fish may be caught in a relatively short time.

Known line pullers often comprised a pair of dished metal plates mounted back-to-back on a rotating shaft to form a nip at their separation point which grips a line such that rotation of the discs tends to wrap the line therearound. To prevent the line from wrapping completely therearound a thin metal blade is commonly inserted into the nip to disengage the line from between the discs. In practice a thin metal blade was welded to a base member which, in turn was mounted adjacent the plates. To effectively remove the line from the nip the metal blade had to be inserted to the very bottom of the nip to prevent its looping past the end of the blade and being cut or carried completely around the rotating discs. The thinness and consequent structural weakness of the prior art metal blades allowed them to be easily moved laterally by the line such that they contacted the rotating discs thereby creating a metal-to-metal screeching noise which has been known to cause a school of tuna to scatter or rapidly change course thus effectively ending the possibility of successful fishing. Further, the movement of the prior art metal line stripping fingers often allowed the line to slip thereby where it would be cut by the ground metal edge of the blade inserted into the nip. Additionally the continued vibration of the blade coupled with the effects of the salt atmosphere thereon often resulted in the blade snapping near its tip or at the point at which it was welded to its base.

BRIEF SUMMARY OF THE INVENTION

The instant invention provides an improved line pulling apparatus wherein the line stripping means is constructed as a single unitary piece from a non-metallic material to prevent operational noise and reduce fatigue failure. Additionally, the line stripping finger is contoured to completely fill the nip and the generally V-shaped gap between the flanged plates of the line puller to prevent the line from being pulled therepast. The stripping finger is structurally strengthened by a knife edge support extending oppositely from the line contacting surface of the stripping finger, the knife edge being curved to correspond generally to the circular junction line of the plates to provide increased strength to the tip of the finger where it is most needed.

It is an object of the present invention therefore, to provide a line pulling apparatus having a low operating noise level.

Another object is to provide a line pulling apparatus capable of operating for long periods without breaking down or cutting or tangling the line.

Another object of the present invention is to provide a line pulling apparatus having a line stripping finger with a line contacting surface which is contoured to completely fill the space between the flanged plates of the line puller to prevent the line from being wound therepast.

One more object is to provide a line pulling apparatus having a line stripping means which is vibration resistant and durable.

Another object is to provide a line pulling apparatus having a line stripping means which is curved to peel the line smoothly from the nip of the line puller.

Still another object of the present invention is to provide a line pulling apparatus having a line stripping finger which is molded from a non-metallic material.

Other and additional objects and advantages will be apparent from the following description taken in conjunction with the accompanying drawings.

DETAILED DESCRIPTION OF THE INVENTION

Figure 1:
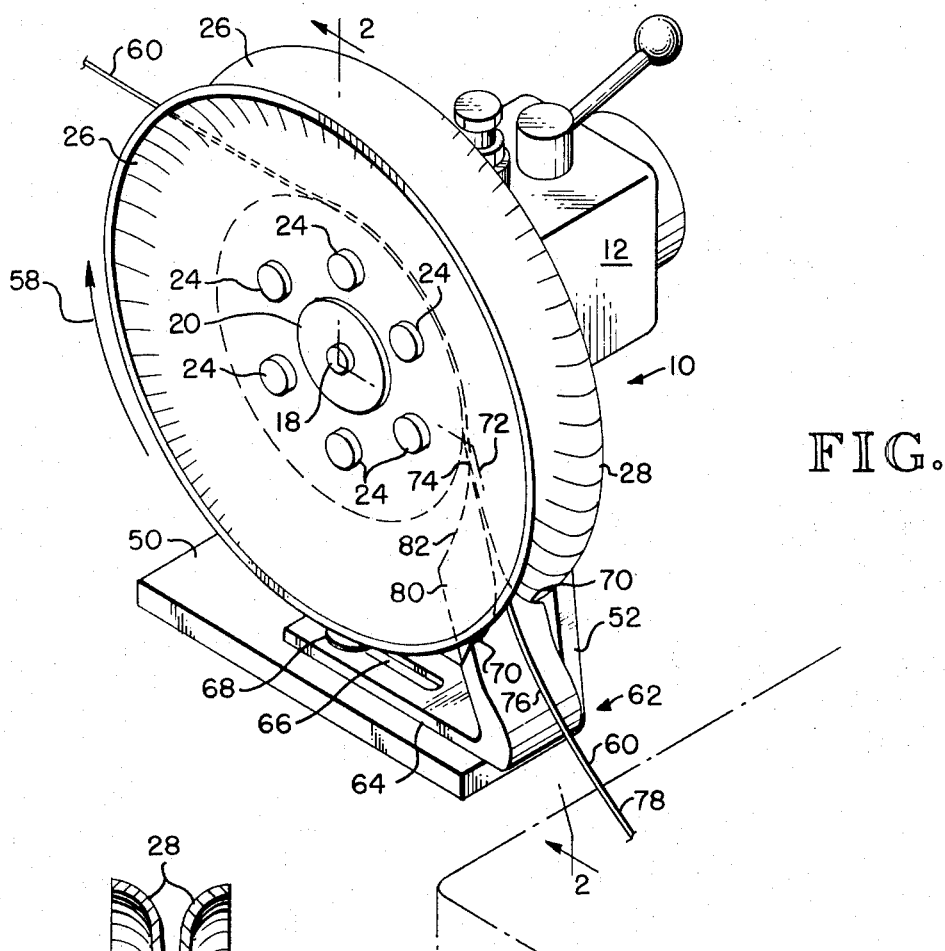
FIG. 1 is a perspective view of a typical line pulling apparatus constructed according to the instant invention including a line being pulled therearound.
Figure 2:
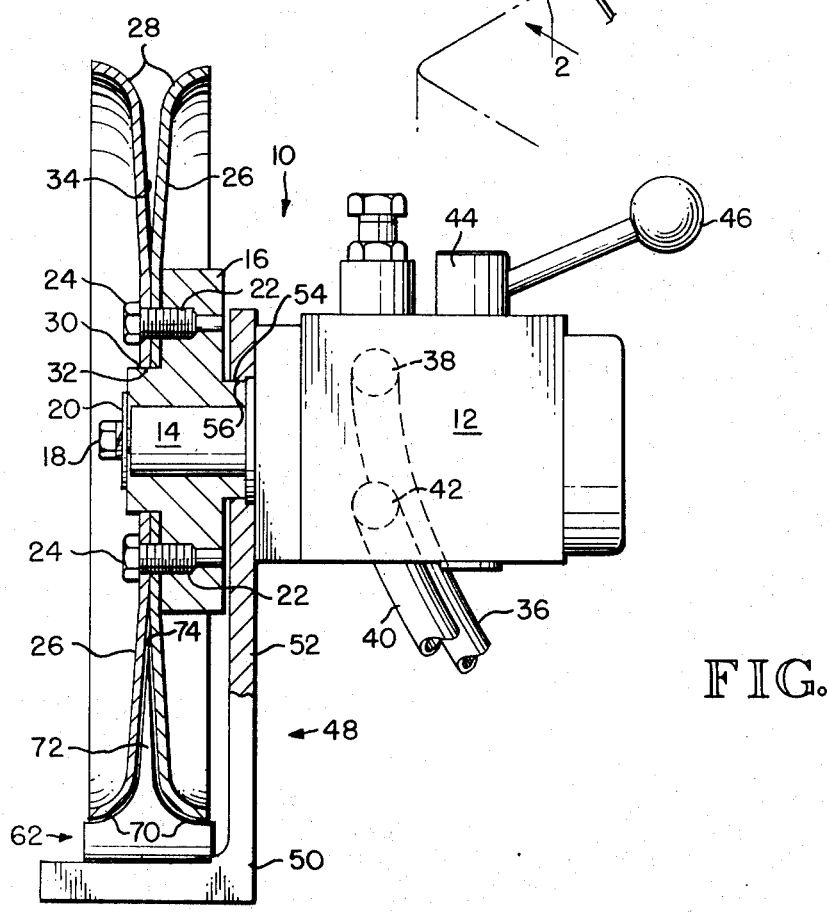
FIG. 2 is a sectional view taken along lines 2—2 of FIG. 1.

Referring initially to FIGS. 1 and 2, a line pulling apparatus 10 is disclosed comprising a motor 12 rotatably driving a shaft 14 on which a hub 16 is fixedly mounted and held by means of conventional bolt 18 threaded into a cooperating hole in the end of shaft 14 to press washer 20 against the hub. Hub 16 includes a plurality of radially spaced internally threaded openings 22 adapted to receive cooperatingly threaded bolts 24 which are inserted through radially spaced aligned holes in a pair of metal plates 26 to clamp the plates to the hub on a circular line inward from their periphery.

Metal plates 26 include flanged edge portions 28 and central holes portions 30 sized to slip onto shoulder 32 of hub 16 and are mounted back-to-back on hub 16 such that the flanged edge portions 28 of each plate extend in opposite directions to define a generally V-shaped peripheral nip 34 therebetween.

As will be discussed more completely hereafter, proper operation of the line pulling apparatus 10 requires that plates 26 be formed as near identical in shape as possible so that the outwardly diverging walls of nip 34 are spaced a uniform distance from each other at all points around the plates 26 at any selected axial distance from shaft 14. Further it is important that these plates maintain the identity of their shapes over long periods of use and thus these plates are commonly formed of a rigid metal materal by hydro forming or a like process allowing the repeated fabrication of similarly shaped plates.

As illustrated, motor 12 is a conventional hydraulic motor having fluid intake line 36 mounted on an intake port 38 and a fluid outflow line 40 mounted on fluid exit port 42. Fluid flow control valve 44 is manually operable by movement of handle 46 to govern the rate of fluid flow past a rotor within motor 12 the rotation of which is transmitted in a known manner to shaft 14. It has been found that motors of this type are particularly suited for use in conjunction with a line pulling apparatus mounted for use in the wet, salty atmosphere of a fishing vessel, but it is contemplated that electric motors or other suitable means for rotatably driving shaft 14 may also be used.

Motor 12 and interconnected rotatable plates 26 are shown to be mounted on a support bracket 48 having a base portion 50 and a generally vertical wall portion 52 including a hole 54 in which shoulder 56 of hub 16 is mounted.

Figure 3:
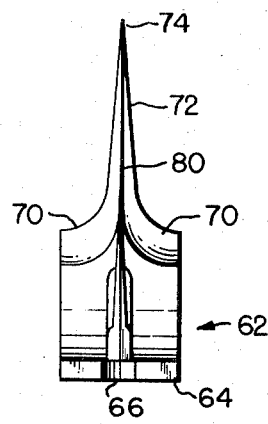
FIG. 3 is an elevation view of a typical non-metallic line stripper constructed according to the teachings of the instant invention.
Figure 4:
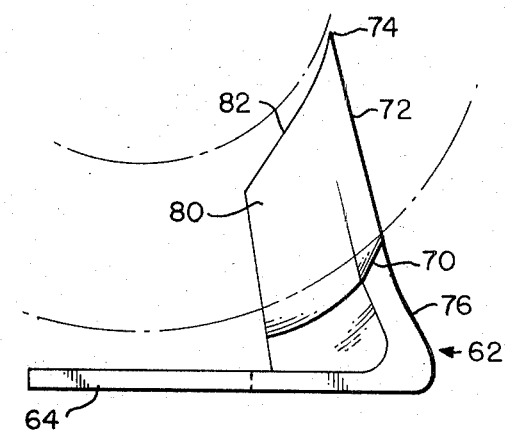
FIG. 4 is a side elevation view of the line stripper of FIG. 3.
Figure 5:
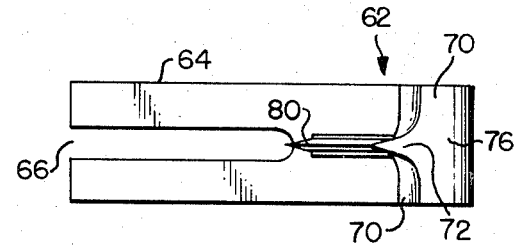
FIG. 5 is a plan view of the line stripper of FIG. 3.

In operation of this apparatus, plates 26 are rotated in the direction indicated by arrow 58 such that a line 60 laid in nip 34 is pulled downwardly into the nip such that the line begins to wrap around the joined plates. It will be understood that the speed of rotation of the joined plates controls the speed at which the line is retrieved, but as discussed above, in order to allow the line to be rapidly fed out after a fish is pulled into the boat and unhooked a line stripper 62 is inserted into the nip to strip the line therefrom and prevent its being wound onto the joined plates. Referring additionally to FIGS. 3, 4 and 5, it will be seen that line stripper 62 includes a forked base portion 64 having a slot 66 whereby stripper 62 may be adjustably mounted on the base portion 50 of bracket 48 by conventional washer and bolt means 68 inserted therein (FIG. 1). Shoulders 70 extend upwardly from base 64 laterally adjacent finger or neck 72 which extends additionally upwardly such that the knife blade-like tip 74 thereof is adjacent the bottom of nip 34. As line 60 is pulled around the circular arc formed by the joining of plates 26, it contacts the tip 74 of line stripper 62 such that the line is peeled out of nip 34 and runs down the line contacting surface 76 of the stripper and into a container 78 or the like.

In order to effectively remove the line from nip 34 and prevent its being pulled past neck 72 and tangled thereabout, it will be understood that the tip 74 must be very thin in order that it may reach to the very bottom of the nip 34. High speed operation of the line puller, however, can generate substantial forces on this tip and thus a knife blade support edge 80 is provided extending outwardly from neck 72 opposite the line contacting surface of the stripper and including a curved top edge 82 contoured generally to conform to the curvature of the bottom portion of the nip 34 such that support may be provided to tip 74.

Shoulders 70 and neck 72 are themselves contoured to conform to the side wall diversions of nip 34 such that, as best seen in FIG. 2, nip 34 is entirely filled by line stripper 62 to prevent the pulled line from moving past the stripper and insuring consistent stripping operation.

Line stripper 62 may be formed of any suitable non-metallic material, and in one embodiment has been satisfactorily formed from a nylon-glass combination with the glass percentage varying between 30 and 50 percent. While known metallic line stripping fingers must, of necessity, be maintained spaced from the side walls of the nip 34 in order to prevent unwanted metal-to-metal screeching, use of the non-metallic line stripper allows the stripper to be mounted adjacent the joined plates such that the shoulders and neck 70 and 72 are pressed into the nip to fill it and thereby prevent the line from being pulled thereby as was common in the past.

It has been found that use of a non-metallic line stripping finger eliminates the damaging effects of electrolysis which, in the past, substantially shortened the useful life of metal stripping fingers. Additionally, the non-metallic line stripper may be molded to include a self-lubricating substance such as Teflon or the like to reduce the drag of the line stripper on the rotating plates.

The use of the non-metallic line stripping finger which can be inserted into nip 34 without worry about the extent of contact by the finger with the side walls of the nip reduces the need for maintaining the identical configuration of plates 26 in that a slight wobbling of the plate and consequent contact with the finger does not result in the metal-to-metal screech heretofore known. This has substantially extended the useful life of the discs 26.

The invention may be embodied in other specific forms without departing from the spirit or central characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore to be embraced therein.

What is claimed is:

1. A fish line pulling apparatus with a low operating noise level comprising:
    a pair of like sized metal plates having oppositely outwardly flanged edge portions, said plates being joined on a circular line radially inward from their peripheries to define a nip;
    power means rotating said joined metal plates such that a fish line placed in said nip is squeezed and pulled to be wrapped therearound;
    a non-metallic line stripper including a base portion rigidly mounted adjacent said plates and an integral finger portion extending into and substantially completely filling said nip and including a fish line contacting surface to lead said fish line outwardly from between the flanged edges;

said non-metallic line stripper being injection molded from a combination of from 50 to 70 percent nylon and from 50 to 30 percent glass;

said finger portion including a tip extending substantially to the bottom of said nip, said tip including a knife edge stiffening member extending into said nip opposite said line contacting surface, the top portion of said stiffening member being curved to conform to a segment of the junction line of said plates; and said fish line contacting surface including shoulder portions contoured to form to said outwardly flanged edge portions of said plates to prevent said fish line from being pulled past said fixed finger by said rotating plates.

2. The fish line pulling apparatus of claim 1 wherein said shoulders and said tip of said non-metallic line stripper contacts said spinning metal plates without producing a metal to metal abrasion noise.

* * * * *